United States Patent
Xie

(10) Patent No.: US 10,498,661 B2
(45) Date of Patent: *Dec. 3, 2019

(54) PACKET LOSS TOLERANT TRANSMISSION CONTROL PROTOCOL CONGESTION CONTROL

(71) Applicant: Netflix, Inc., Los Gatos, CA (US)

(72) Inventor: Qiaobing Xie, Chesterfield, MO (US)

(73) Assignee: Netflix, Inc., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/357,110

(22) Filed: Mar. 18, 2019

(65) Prior Publication Data

US 2019/0215274 A1      Jul. 11, 2019

Related U.S. Application Data

(63) Continuation of application No. 15/391,335, filed on Dec. 27, 2016, now Pat. No. 10,284,480.

(51) Int. Cl.
*H04L 12/825* (2013.01)
*H04L 12/701* (2013.01)
(Continued)

(52) U.S. Cl.
CPC ........ *H04L 47/263* (2013.01); *H04L 43/0829* (2013.01); *H04L 43/0882* (2013.01);
(Continued)

(58) Field of Classification Search
CPC ... H04L 47/253; H04L 47/18; H04L 43/0882; H04L 47/323; H04L 45/00
See application file for complete search history.

(56) References Cited

U.S. PATENT DOCUMENTS 6,505,253 B1 * 1/2003 Chiu ................... H04L 12/1868
370/229
8,875,208 B1 * 10/2014 Abkairov ............... H04L 65/60
725/115

(Continued)

FOREIGN PATENT DOCUMENTS

| CA | 3 042 283 A1 | 7/2018 |
| WO | 2006/058255 A2 | 6/2006 |
| WO | 2018/125390 A1 | 7/2018 |

OTHER PUBLICATIONS

Dong et al., "PCC: Re-architecting Congestion Control for Consistent High Performance", Proceedings of the 12th USENIX Symposium on Networked Systems Design and Implementation (NSDI '15), May 4-6, 2015, 15 pages.

(Continued)

*Primary Examiner* — Mohammad S Anwar
(74) *Attorney, Agent, or Firm* — FisherBroyles, LLP

(57) ABSTRACT

During a Transmission Control Protocol ("TCP") session, a sending endpoint computer monitors amounts of data sent and patterns of data loss as data is sent to a receiving endpoint computer. The sending endpoint computer periodically determines whether data is being sent below, at or above path capacity, based on the monitored amounts of data sent and patterns of data loss observed. The sending endpoint computer periodically dynamically adjusts the rate at which data is sent to the receiving endpoint computer, in response to the determinations whether data is being sent below, at or above path capacity.

20 Claims, 6 Drawing Sheets

(51) Int. Cl.
    *H04L 12/823*     (2013.01)
    *H04L 12/26*     (2006.01)
    *H04L 12/801*     (2013.01)

(52) U.S. Cl.
    CPC .............. *H04L 45/00* (2013.01); *H04L 47/18* (2013.01); *H04L 47/323* (2013.01)

(56) References Cited

U.S. PATENT DOCUMENTS

| | | | |
|---|---|---|---|
| 10,284,480 B2 * | 5/2019 | Xie | H04L 47/263 |
| 2002/0010938 A1 * | 1/2002 | Zhang | H04L 47/263 |
| | | | 725/95 |
| 2003/0046383 A1 * | 3/2003 | Lee | H04L 41/046 |
| | | | 709/224 |
| 2003/0149785 A1 * | 8/2003 | Gerla | H04L 29/06 |
| | | | 709/232 |
| 2007/0076613 A1 * | 4/2007 | Malhotra | H04L 43/00 |
| | | | 370/235.1 |
| 2010/0095021 A1 | 4/2010 | Samuels et al. | |

OTHER PUBLICATIONS

Hayes et al., "Revisiting TCP Congestion Control using Delay Gradients", Proceedings of Networking 2011, 10th International IFIP TC 6 Networking Conference, May 9-13, 2011, pp. 1-14.

Mittal et al., "Timely: RTT-based Congestion Control for the Datacenter", ACM SIGCOMM '15, Aug 17-21, 2015, 14 pages.

International Search Report and Written Opinion received for PCT Application Serial No. PCT/US2017/060898 dated Feb. 1, 2018, 12 pages.

\* cited by examiner

PACKET LOSS TOLERANT TRANSMISSION CONTROL PROTOCOL CONGESTION CONTROL

CROSS REFERENCE TO RELATED APPLICATION

This application is a continuation of U.S. application Ser. No. 15/391,335, filed 27 Dec. 2016, the disclosure of which is incorporated, in its entirety, by this reference.

TECHNICAL FIELD

This disclosure pertains generally to network traffic management, and more specifically to Transmission Control Protocol ("TCP") congestion that is tolerant of packet loss.

BACKGROUND

Conventional TCP is very sensitive to packet losses. For example, with the congestion control mechanisms of TCP NewReno, a mere 0.1% random packet loss in the path could result in a 20-30% drop in goodput. This is the primary reason TCP does not perform well over paths that involve lossy links (e.g., poorly connected wireless links).

TCP's loss intolerance is fundamentally a byproduct of Van Jacobson's congestion control and congestion avoidance (VJ-CCCA) algorithm, on which congestion control in TCP and all its modern variations are built. In 1988, Jacobson described the "congestion collapse" problem observed in the ARPANET, during which goodput dropped by a factor of over one thousand due to congestion. Jacobson outlined VJ-CCCA as a remedy, which remains the foundation of conventional TCP congestion control mechanisms today. Jacobson's algorithm treats observed packet loss as a signal of network congestion, and assigns full responsibility for addressing network congestion problems to the endpoints. VJ-CCCA works by slowing down endpoint activity in response to packet loss, based on the assumption that the links themselves are reliable. VJ-CCCA has a goal of protecting the Internet itself by avoiding congestion collapse.

Those design choices were appropriate to the conditions of the time, when the network and routing infrastructures were in their infancy, with little overloading protection and very rudimentary traffic management. Most of the hosts at that time were essentially directly connected to the backbone, and there were no ISPs. As a result, network stability was completely a function of the behaviors of the hosts. Furthermore, links were based on physical connections with low bit-error rates, and thus transmission errors were relatively rare.

The Jacobson algorithm and the subsequent variations thereon worked well and delivered stability to the Internet for a long period of time after its introduction. But with the evolution and commercialization of the Internet during the last decade or so, certain undesirable side effects of this strong remedy are being seen. One such problem is the degradation of goodput when the path becomes lossy, which is a common scenario with wireless links such as those based 802.11 (Wi-Fi) or cellular protocols. Treating packet loss as a sign of congestion assumes reliable links, and thus TCP congestion control which is based on VJ-CCCA is highly sensitive to packet loss. This becomes problematic with the current prevalence of wireless links, on which packets are frequently lost as a result of transmission errors rather than congestion.

Another fundamental change between the 1988 ARPANET and the modern Internet is the introduction of the service and user management layer, which is a key result of the commercialization of the Internet. This management layer is necessary because no for profit business could be practicably built without control over who could access its services and to what extent. This service/user management layer (which often takes the form of admission control, subscriber management, policy management, network security, etc.) sits between the users (the hosts) and the actual traffic routing function (the routers and backbone), and only permits user traffic that meets the service agreement and usage policy and that does not pose security threats, including threats to the network's stability, to be passed onto the routing function. With the addition of this management layer, the stability of the network is no longer a function of the behaviors of the individual hosts/users. The original "disease" (network congestion collapse) that Jacobson's remedy was created to "treat" has arguably become a very unlikely possibility. This fundamentally changes the assumptions of VJ-CCCA, and brings the original congestion control design choices into question.

It would be desirable to address these issues.

SUMMARY

A loss tolerant TCP transport is provided, which maintains decent goodput and performs well in lossy environments, such as Wi-Fi, cellular, low-quality ISPs, etc. To achieve loss tolerance, the transport is not based upon VJ-CCCA. Instead, self-learning convergence functionality is utilized to detect and control congestion and transmission rate over the data path. More specifically, in contrast to VJ-CCCA, rather than trying to manage the network congestion and stability from an endpoint, the loss tolerant transport focuses on managing the path congestion between the two communicating endpoints. By focusing on avoiding overloading or underutilizing the path, the loss tolerant transport achieves optimal goodput under the given path condition. The loss tolerant transport on a transmitting endpoint uses feedback from the network and information contained in responses from the receiving endpoint to adjust the transmission rate.

The separation of loss management and congestion management enables the loss tolerant transport to provide loss tolerant congestion control. This is the case because in a lossy environment (e.g., one utilizing Wi-Fi or cellular), packet losses in the data path are often a result of link layer bit error rate, which can persist even when the path is completely unsaturated. In contrast, congestion induced data losses (e.g., tail drops) occur mainly when the path (or a portion of it) is fully loaded to its designated capacity. Separately from the congestion management functionality, a loss management component executes data loss detection and repair functionality, and manages the timing and order of lost data retransmission. A sending logic component enforces sending rate, and in some embodiments employs hybrid pacing functionality to improve the efficiency of data transmission, and to enforce rate management granularity.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A loss insensitive transport maintains decent goodput and performs well in lossy environments, such as Wi-Fi, cellular, low-quality ISPs, etc. To achieve loss tolerance, the loss insensitive transport is not based upon VJ-CCCA. Instead, self-learning convergence functionality is utilized to detect and control congestion and transmission rate over the data path. More specifically, in contrast to VJ-CCCA, rather than trying to manage the network congestion and stability from an endpoint, path congestion between the two communicating endpoints is managed. By focusing on avoiding overloading or underutilizing the path, optimal goodput under the given path condition is achieved.

The loss insensitive transport is transparent to the receiving end point. The transmitting endpoint (e.g., a server) uses feedback from the network and information contained in responses from the receiving endpoint running a conventional transport (e.g., a client) to adjust transmission.

The loss insensitive transport can contain the three following functional blocks: path congestion management, loss management and sending logic. The separation of loss management and congestion management enables the provision of loss tolerant congestion control. This is the case because in a lossy environment (e.g., one utilizing Wi-Fi or cellular), packet losses in the data path are often a result of link layer bit error rate, which can persist even when the path is completely unsaturated. In contrast, congestion induced data losses (e.g., tail drops) occur mainly when the path (or portion of it) is fully loaded to its designated capacity. For this reason, loss management is separated from congestion management.

The loss management routines execute data loss detection and repair functionality, and manage the timing and order of lost data retransmission. The sending logic enforces sending rate. The sending logic may also employ hybrid pacing functionality to improve the efficiency of data transmission, and to enforce rate management at a finer level of granularity.

Figure 1:
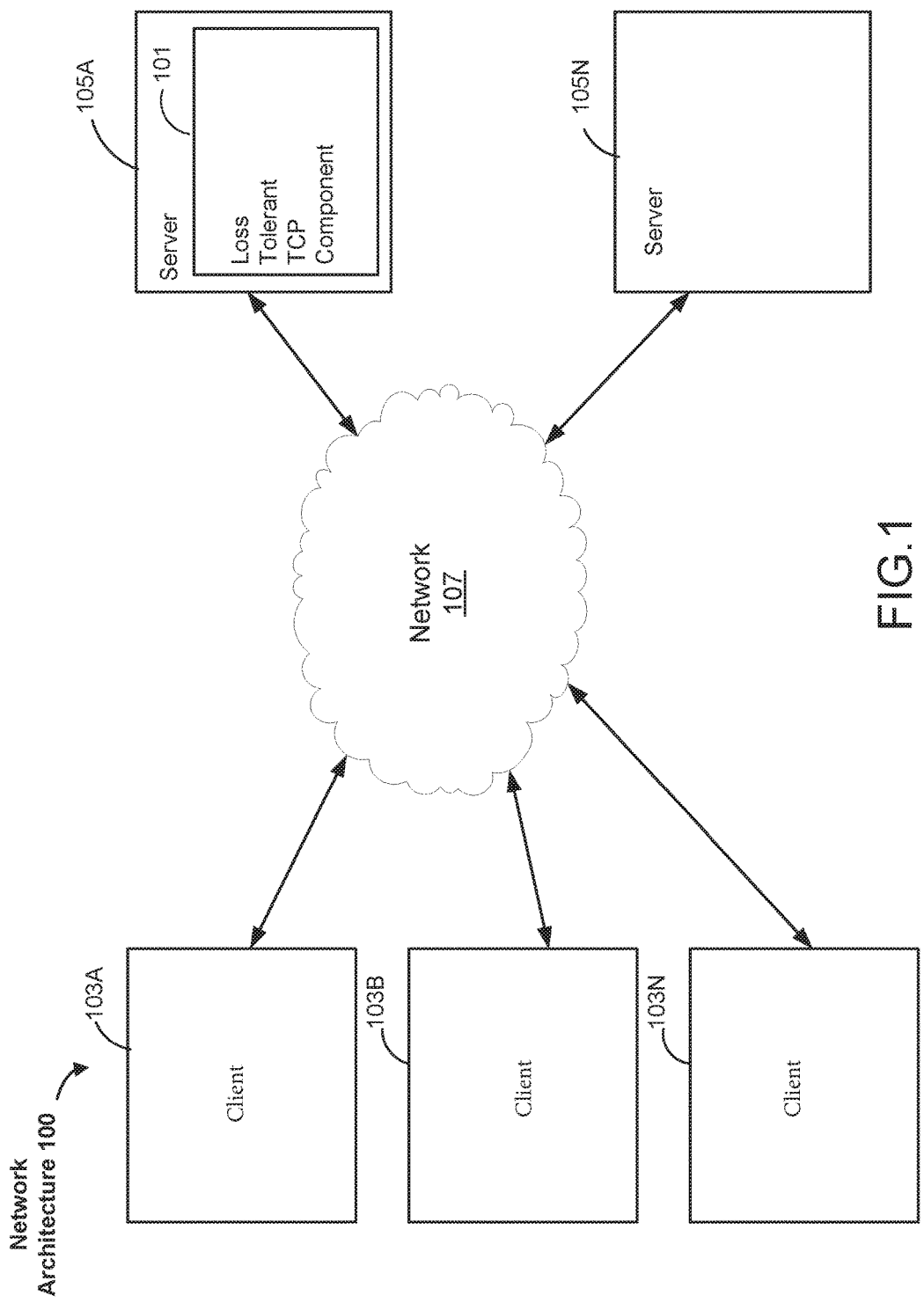
FIG. 1 is a block diagram of an exemplary network architecture in which a loss tolerant TCP component can be implemented, according to some embodiments.

FIG. 1 is a block diagram illustrating an exemplary network architecture 100 in which a loss tolerant TCP component 101 can be implemented. The illustrated network architecture 100 comprises multiple clients 103A, 103B and 103N, as well as multiple servers 105A and 105N. Although FIG. 1 illustrates three clients 103 and two servers 105A-N as an example, in practice many more (or fewer) clients 103 and/or servers 105 can be deployed. In one embodiment, the network 107 is in the form of the Internet, although other networks can be used in other embodiments (e.g., a private enterprise level wide area network).

The clients 103 and server 105 communicate over the network 107, for example via a network interface 648 or modem 647 as described below in conjunction with FIG. 6. In FIG. 1, a loss tolerant TCP component 101 is illustrated as residing on a server 105A. It is to be understood that this is an example only, and in various embodiments various functionalities of a loss tolerant TCP component 101 can be instantiated on a client 103, a server 105, or can be distributed between multiple clients 103 and/or servers 105. Clients 103 are able to access applications and/or data on servers 105 using, for example, a web browser or other client software (not shown).

Clients 103 and servers 105 can be implemented using computer systems 610 such as the one illustrated in FIG. 6 and described below. Clients 103 can be in the form of desktop computers, laptop computers, or mobile computing devices, comprising portable computer systems capable of connecting to a network 107 and running applications. Some such mobile computing devices are sometimes referred to as smartphones, although some mobile phones not so designated also have these capabilities. Tablets and wearable computing devices (e.g., smart watches, bracelets, glasses, etc.) are other examples of mobile computing devices.

Figure 2:
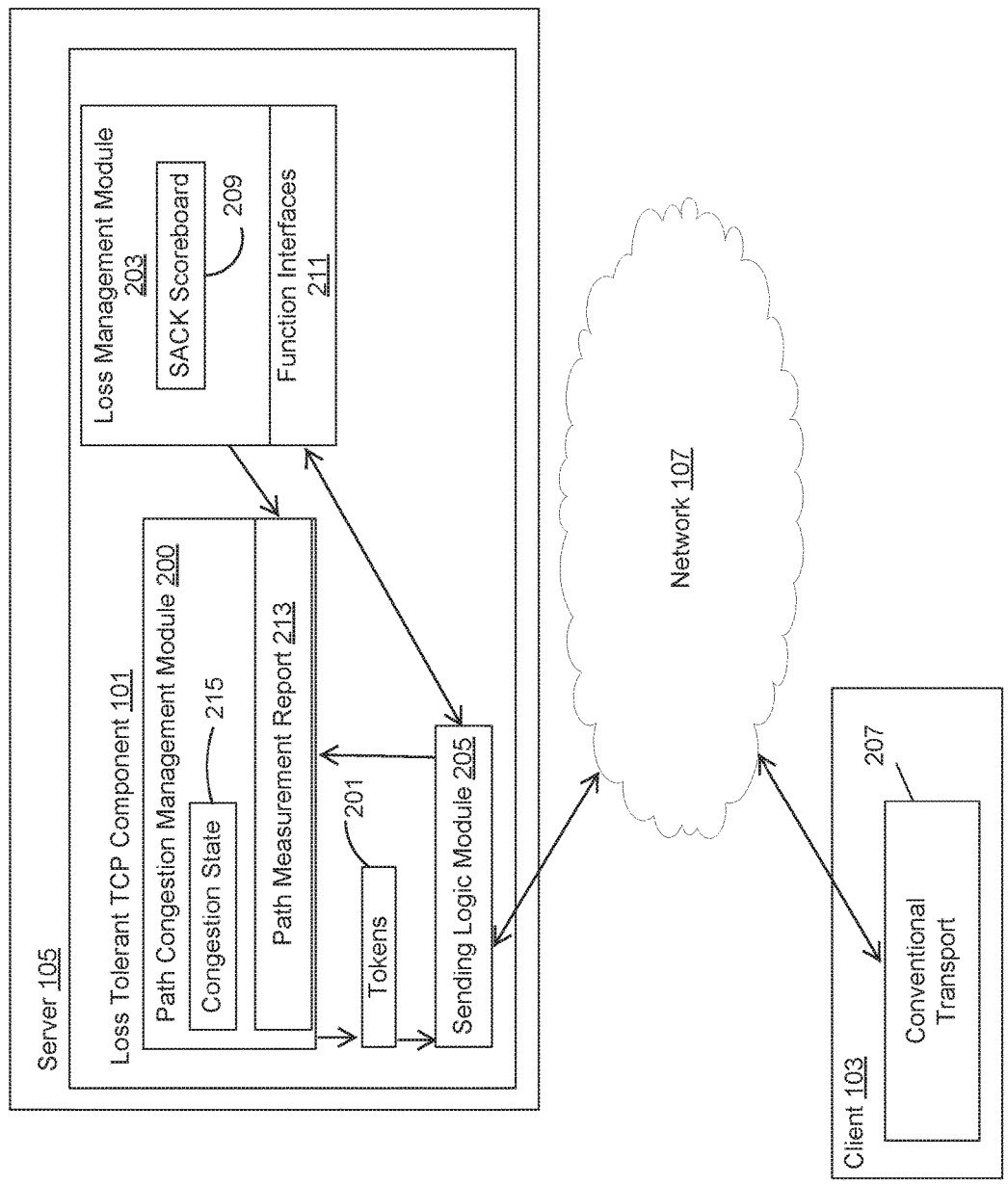
FIG. 2 is a block diagram of the operation of a loss tolerant TCP component, according to some embodiments.

FIG. 2 illustrates the operation of a loss tolerant TCP component 101, according to some embodiments. In FIG. 2 illustrates a loss tolerant TCP component 101 residing on a server 105. Typically, the loss tolerant TCP component 101 is TCP wire-compliant, meaning that no client side changes are required. As described above, the functionalities of the loss tolerant TCP component 101 can reside on a server 105, a client 103 or be distributed between multiple computer systems 610. It is to be understood that although the loss tolerant TCP component 101 is illustrated in FIG. 2 as a single entity, the loss tolerant TCP component 101 represent a collection of functionalities, which can be instantiated as a single or multiple modules as desired. In some embodiments, the different modules of the loss tolerant TCP component 101 can reside on different computing devices 610 as desired. The loss tolerant TCP component 101 is implemented as part of the kernel stack. In another embodiment the loss tolerant TCP component 101 can be implemented as a user-space transport stack, but this implementation involves running the data path through user space, and thus can impact the server side scalability.

It is to be understood that the modules of the loss tolerant TCP component 101 can be instantiated (for example as object code or executable images) within the system memory 617 (e.g., RAM, ROM, flash memory) of any computer system 610, such that when the processor 614 of the computer system 610 processes a module, the computer system 610 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the loss tolerant TCP component 101 can be stored on computer-readable storage media. Any form of tangible computer readable storage medium can be used in this context, such as magnetic, optical, flash and/or solid state storage media. As used herein, the term "computer readable storage medium" does not mean an electrical signal separate from an underlying physical medium.

The loss tolerant TCP component 101 is a transport that is loss insensitive, such that it maintains decent goodput and performs well in lossy environments, such as Wi-Fi, cellular, low-quality ISPs, etc. To achieve loss tolerance, the loss tolerant TCP component 101 is not based upon VJ-CCCA. Instead, self-learning convergence functionality is utilized to detect and control congestion and transmission rate over the data path. More specifically, in contrast to VJ-CCCA, rather than trying to manage the network congestion and stability from an endpoint, the loss tolerant TCP component 101 focuses on managing the path congestion between the two communicating endpoints. By focusing on avoiding overloading or underutilizing the path, the loss tolerant TCP component 101 achieves optimal goodput under the given path condition.

The loss tolerant TCP component 101 is transparent to the receiving endpoint 610. As explained in detail below, the loss tolerant TCP component 101 on a transmitting endpoint (e.g., the server 105 in FIG. 2) uses feedback from the network 107 and information contained in responses from the receiving endpoint running a conventional transport 207 (e.g., the client in FIG. 2) to adjust transmission.

In the embodiment illustrated in FIG. 2, the loss tolerant TCP component 101 contains the three following functional blocks: a path congestion management module 200, a loss management module 203 and a sending logic module 205. As explained in greater detail below, the separation of loss management and congestion management enables the loss tolerant TCP component 101 to provide loss tolerant congestion control. This is the case because in a lossy environment (e.g., one utilizing Wi-Fi or cellular), packet losses in the data path are often a result of link layer bit error rate, which can persist even when the path is completely unsaturated. In contrast, congestion induced data losses (e.g., tail drops) occur mainly when the path (or a portion of it) is fully loaded to its designated capacity. For this reason, loss management is separated from congestion management. As described in greater detail below, the loss management module 203 executes data loss detection and repair functionality, and manages the timing and order of lost data retransmission. The sending logic module 205 enforces sending rate. In some embodiments, the sending logic module 205 also employs hybrid pacing functionality to improve the efficiency of data transmission, and to enforce rate management at a finer level of granularity.

Turning first to loss management, the loss management module 203 of the loss tolerant TCP component 101 processes incoming SACKs, tracks all missing sequence numbers reported by the receiving endpoint (in the form of a "SACK holes" list), measures and tracks newly missing sequence numbers (i.e., sequence numbers that are reported as missing for the first time), as well as newly SACKed/ACKed data (i.e., data being reported as received for the first time in the latest SACK). The loss management module 203 can also track the last time when a particular missing sequence number range was retransmitted, and determine which missing sequence number range is to be retransmitted at the next output opportunity.

The loss management module 203 uses a SACK scoreboard 209 to store SACK related information it receives from the receiving endpoint (e.g., client 103). It is to be understood that as used herein, a "SACK" means a Selective ACKnowledgment, in which the receiving endpoint explicitly lists ranges of bytes, packets, segments, etc. that have been received (or have not been received, e.g., that are negatively acknowledged). A "SACK scoreboard" 209 is a name for a data structure used to store incoming selective acknowledgment information from a specific receiving endpoint. In addition to the fields of a conventional SACK scoreboard 209 such as that used in TCP NewReno, the SACK scoreboard 209 maintained by the loss management module 203 also stores and tracks newly reported missing bytes from the last SACK, and the timestamp when each given SACK hole was last retransmitted.

The newly reported missing bytes field of the SACK scoreboard 209 records, in bytes, the newly reported missing sequence numbers from the latest SACK. In other words, this reports the total number of bytes from all the new SACK holes added to the SACK scoreboard 209 from the latest SACK processing. In one embodiment this field can be implemented in the form of an additional field in the sackhint structure (struct sackhint), although this is a variable implementation detail. The loss management module 203 makes reports of newly missing bytes available to the path congestion management module 200. As described below in more detail, this information is used by the path congestion management module 200 to monitor the congestion state 215 of the path.

Concerning the timestamp of when the SACK hole was last retransmitted, this can be recorded in kernel ticks. Its value is set to 0 when a new SACK hole is first added to the scoreboard 209, indicating that the new SACK hole has never been retransmitted. The timestamp can be implemented as a new field in the sackhole structure (struct sackhole), but again this is a variable implementation detail. It will be understood by those of ordinary skill in the art of networking that the term "SACK hole" in this context means a hole in the data stream that is identified by received Selective ACKnowledgements.

The loss management module 203 can provide function interfaces 211 to the sending logic module 205 for executing loss repair. In one embodiment, one function interface 211 provided by the loss management module 203, referred to herein as loss_tolerant_sack_output ( ), does the following when called by sending logic module 205:

1. Check whether there are any SACK holes on the SACK scoreboard 209 that have never been fully retransmitted. If so, identify and return the oldest of them. Also, if the oldest SACK hole has been partially retransmitted before, indicate the portion of the sequence number range that has never been retransmitted.

2. Else if all of the SACK holes on the SACK scoreboard 209 have already been retransmitted at least once, check whether the oldest one needs to be retransmitted again. If the oldest SACK hole was retransmitted a specific given amount of time ago, return the oldest hole for another retransmission. The specific given amount of time to use is a variable design parameter. In one embodiment, the value 1.25 times smoothed round-trip time (SRTT) kernel ticks is used, but this value can be adjusted up or down as desired.

3. Else return a value (e.g., NULL) indicating that no hole needs to be retransmitted at this time.

Another function interface 211 provided by the loss management module 203, referred to herein as loss_tolerant_sack_output_firsthole ( ), is similar to the function described above, but instead checks the oldest hole on the scoreboard 209 (i.e., the hole that is the first beyond the current ACK point). Typically, the sending logic module 205 always calls loss_tolerant_sack_output_firsthole ( ) before calling loss_tolerant_sack_output ( ), and thus gives precedence to the retransmission of the oldest hole.

Giving precedence to repair the first hole beyond the current ACK point is a loss tolerant TCP component 101 optimization for operating over paths with heavy packet losses, such as in wireless environments. It is not uncommon that multiple retransmissions are needed to repair a hole in such an environment, and the oldest hole on the scoreboard 209 can act like a "plug" that prevents the clearing of other holes behind it.

It is to be understood that the names used herein for the function interfaces 211 provided by the loss management module 203 are simply examples, and other names can be used instead as desired.

Turning now to the operation of the path congestion management module 200, at the beginning of a TCP session this module 201 estimates baseline characteristics of the path. The path congestion management module 200 then continuously monitors the pattern of data loss reported by the receiving endpoint (e.g., the client 103 in FIG. 2). More specifically, the path congestion management module 200 receives as input reports of newly missing bytes from the loss management module 203, and reports of the amount of data recently sent from the sending logic module 205. As described in more detail below, this input is used to determine whether data is being transmitted below, at/close to, or above the underlying path capacity, and adjustments are made to the sending rate accordingly.

When a new TCP session is established, the conventional TCP three way handshake is completed and the session enters an established state. On the endpoint running the loss tolerant TCP component 101 (the server 105 in FIG. 2), path congestion management functionality herein is executed every time the TCP output routine is called. In one embodiment, this can be instantiated through a function interface 211 provided by the path congestion management module 200, called loss_tolerant_path_management ( ) herein (this name is simply an example).

For a given TCP session, the path congestion management functionality goes through two stages: baseline path characteristics measurement stage, and path congestion monitoring and rate control stage. The path congestion management module 200 remains in the first stage until the first N packets are sent. The specific value to use for N is a field configurable variable design parameter. Possible values for N in different embodiments are, e.g., 100, 150, 200, etc. Alternatively, the path congestion management module 200 remains in the first stage until the first detection of a path congestion event.

In the baseline path characteristics measurement stage, the path congestion management module 200 uses a conventional TCP slow-start like process to regulate the sending rate and to grow the Congestion Window ("cwnd"). At the end of this stage, the path congestion management module 200 collects the cwnd which is grown out of the slow-start process, as well as the data sent, data lost, and maximum SACK hole size observed. This data is then used by the path congestion management module 200 to initiate the path management parameters described below.

In the path congestion monitoring and rate control stage, the path congestion management module 200 carries out path congestion monitoring and rate control processing once per every management cycle. In one embodiment, the management cycle is set to be one Smoothed Round-trip Time ("SRTT"). In some embodiments, the frequency of actual rate adjustments varies depending on the path congestion state 215 and several configuration parameters as described in more detail below.

At the end of each management cycle, a path measurement report 213 is generated regardless of whether a rate adjustment is made or not. The path measurement report 213 contains bytes sent, bytes lost, and information concerning the SACK hole pattern observed during the management cycle that just ended. Both new data sent and lost data retransmitted during the cycle are included in bytes sent. Only data newly reported as missing in the cycle is included in bytes lost. For efficiency, the number of most recent path measurement reports 213 retained by the path congestion management module 200 can be limited (e.g., to 1, 2, 5, etc.).

In addition, at the end of each management cycle, the path's congestion state 215 is set. In one embodiment, the congestion state 215 is set to one of the following four states: PATH_UNDERLOADED (a.k.a. "greener"), PATH_LOAD_OK (a.k.a. "green"), PATH_OVERLOADED (a.k.a. "red") and PATH_OVERLOADED2 (a.k.a. "redder"). The names used herein to describe these states are examples only.

The path congestion management module 200 maintains the following three key rate parameters: good_rate, bad_rate and current_rate (the names used herein are just examples). good_rate is the highest rate which the path congestion management module 200 estimates is unlikely to trigger sudden and excessive data losses based on its observation of the path behavior so far during the current session. (As used herein, "excessive" data loss means data loss above a given threshold.) By contrast, bad_rate is the lowest rate estimated to be likely to trigger sudden and excessive data losses based on this observation. In other words, it is believed that if operation at good_rate is maintained, it is unlikely that a policer in the path will be hit, whereas bad_rate is the lowest rate at which sudden and excessive loss is likely to occur.

current_rate this is the rate that will be used to determine the size of the token 201 grant for the next management cycle, which in turn determines how much data can be sent by the sending logic module 205 as described below. The value of current_rate can be set to the value of good_rate. As described in more detail below, the value of current_rate can also be set to other values to probe untested rates between good_rate and bad_rate.

At the beginning of the path congestion monitoring and rate control stage, current_rate is set to the latest cwnd at the end of the first stage, and both good_rate and bad_rate are set to 0, indicating that they are undetermined as yet.

The path congestion management module 200 can execute the following path congestion monitoring and rate control functionality to track and self-adjust the rate parameters, path congestion state 215, and next sending rate. It is to be understood that many of the adjustment thresholds and parameters described below are field configurable variable design parameters, described here set to their default values according to one embodiment.

The path congestion management module 200 determines whether the path is entering a more congested state (a.k.a., "turning red"). This determination is based on analyzing the SACK hole patterns observed in the latest path measurement report 213. An increase in the maximum size of the holes or a sudden jump in the number of new holes is considered as an indication that the path is "turning red." Otherwise, the path congestion management module 200 marks the path as "turning green," meaning that the path is not entering a more congested state.

In the case where the path is "turning red," if the path was in a "green" or "greener" state but is determined to be "turning red" now, the path congestion management module 200 executes the following logic. If the path was in "green," adjust the bad_rate down. The amount by which to lower the bad_rate is a field configurable design variable. In one embodiment the default amount of adjustment is to lower by 6.25%, but other values are possible (e.g., 4.5%, 8%, etc.). If the path congestion management module 200 is not probing an untested rate with the current_rate, it lowers the good_rate as well (e.g., by a default value of 12.5%). In the case of probing an untested rate, the good_rate is left unchanged. If after the above two adjustments the good_rate is above the bad_rate, the path congestion management module 200 resets good_rate to a specific percentage of the adjusted bad_rate (for example, a default value of 87.5%, i.e., ⅞). The path congestion management module 200 then sets current_rate to the new good_rate, sets the path congestion state 215 to PATH_OVERLOADED (a.k.a. "red"), and grants current_rate worth of tokens 201 (by default) to the sending logic module 205. Alternatively, the path congestion management module 200 can instead grant only a portion of current_rate worth of tokens 201 to the sending logic module 205 as desired.

In the case where the path has been in a "red" or "redder" state for a duration of more than (e.g.) three times SRTT and is now "turning red" again, the following logic is executed. Adjust the bad_rate down, for example by a default amount of 25%. If after the above adjustment the good_rate is now above the bad_rate, reset the good_rate to the specific percentage (e.g., 87.5%) of the adjusted bad_rate, and set current_rate to the new good_rate. The path congestion state 215 is changed to PATH_OVERLOADED (a.k.a. "redder"), and grant current_rate (or a portion thereof) worth of tokens 201 are granted to the sending logic module 205.

If the path has been in "green" or "greener" state for a "short" duration (e.g., more than five times SRTT) and is now "turning green" again, the path is considered underutilized. In such a case the path congestion management module 200 makes a minor upward rate adjustment. More specifically, the path congestion management module 200 can raise the good_rate by a given value, e.g. by a default value of 1.56%. If the bad_rate is now below the adjusted good_rate, the path congestion management module 200 raises the bad_rate to a given value, e.g., 1.56% by default, above the good_rate. By default, the path congestion management module 200 now sets the current_rate to the adjusted good_rate. The path congestion management module 200 can instead at this point set the current_rate to a probing rate between the adjusted good_rate and the adjusted bad_rate. The path congestion state 215 is set to PATH_UNDERLOADED (a.k.a. "greener"), and the current_rate worth of tokens 201 can be granted to the sending logic module 205.

If the path has been in "green" or "greener" state for a "long" duration (e.g., more than 45 times SRTT) and is now "turning green" again, the path may be considered very underutilized. In such a case the path congestion management module 200 makes a larger upward rate adjustment, e.g., raising good_rate to either current_rate (this is likely an untested rate being probed as the path has been in "green" for a while now), or to the highest total_sent in the recent recorded cycles, whichever is higher. If the bad_rate is below the adjusted good_rate, the bad_rate can be raised to be a given percentage or other value above the good_rate, such as 1.56% by default. If the bad_rate is set (this is likely, except for at the beginning of a session), current_rate can be set to a smaller percentage above the adjusted good_rate (e.g., 3.12%), otherwise to a higher one (e.g., 25%). The path congestion state 215 is set to PATH_UNDERLOADED (a.k.a. "greener"), and the current_rate worth of tokens 201 is granted to the sending logic module 205.

Finally, in the case where the path has been in a "red" or "redder" state for a given duration (e.g., more than three times SRTT) and is "turning green" now, the path congestion management module 200 sets current_rate to good_rate, changes the path congestion state 215 to PATH_LOAD_OK (a.k.a. "green"), and grants out the current_rate worth of tokens 201 to the sending logic module 205.

Turning now to the sending logic, this module 205 enforces the sending rate determined by the path congestion management module 200 as described above. As described in more detail below, in some embodiments the sending logic module 205 also executes dynamic hybrid pacing functionality. In other embodiments, conventional TCP pacing is utilized in conjunction with the path congestion management functionality described herein.

Turning first to the enforcement of the sending rate, the sending logic module 205 can execute conventional (e.g., TCP NewReno) sending logic, with the addition of the rate control enforcement as described herein. Once the path congestion management module 200 completes the path baseline characteristics measurement stage as described above, the sending logic module 205 stops following the slow-start process (no longer pays attention to snd_cwnd and snd_ssthresh), and starts to apply the loss tolerant TCP based rate control using token bucket based functionality to regulate the sending rate. However, it is to be understood that the TCP receiver window is always observed throughout the process. It is to be understood that the TCP receiver window is the amount of data the receiver can accept without acknowledging the sender.

In one embodiment, the sending logic module 205 executes rate control as follows, based on tokens 201 granted by the path congestion management module 200 as described above:

1. Both new and retransmission data are allowed to be sent when there are sufficient tokens 201 available (e.g., sufficient tokens 201 to cover the length of the data being sent);

2. When both new and retransmission data are available, the retransmission data are sent ahead of the new data;

3. When sending retransmission data, the first hole beyond the current ACK point is sent ahead of other retransmission data if both types are ready to be retransmitted;

4. After a successful transmission, the length of the data sent (new or retransmission) is subtracted from the token 201 count;

5. If there is no more token 201 available, but there is currently no unacknowledged data outstanding, up to one segment of extra data may be sent;

6. If there is no more token 201 available, but the sending logic module 205 is attempting to send a retransmission of the first hole beyond current ACK point (i.e., the "plug"), that hole may be sent regardless;

7. Otherwise if there is no more token 201 available, the sending logic module 205 stops sending any data until new tokens 201 are granted from the path congestion management module 200 as described above.

It is to be understood that in different embodiments the sending logic module 205 can utilize variations of the above described token bucket based functionality to enforce the rate control, based on tokens 201 granted by the path congestion management module 200.

As noted above, in some embodiments the sending logic module 205 also employs dynamic hybrid pacing, which can take the form of microburst pacing and/or token slicing, which can be run together or separately. The microburst pacing can be dynamically enabled when the session is not in recovery mode, i.e., no SACK holes are present in the scoreboard 209. This is because when in recovery mode, the SACK clocking will be sufficient to spread the data transmission out, providing similar effects as pacing without incurring the computational cost of running timers. When the microburst pacing is enabled and there are sufficient data to be sent, the sending logic module 205 breaks the data into microbursts, of n segments each, and only sends one microburst of data at a time. The value to use for n is a field configurable design parameter (possible values include, for example, 10, 15, 20, etc.). If there are more microbursts to be sent, the sending logic module 205 sets a pacing timer before returning. The timer interval is set so that the microbursts are spread close to evenly across one SRTT period.

Token slicing can be used to divide the tokens 201 granted by the path congestion management module 200 at the beginning of each management cycle into n slices, and release one slice to the sending logic initially, and release another slice when the sending logic runs out of the current slice and the previous slice was released (SRTT/n) ticks ago. This will continue until either all then slices are released or a new token 201 grant is made by the path congestion management module 200. (When a new grant is made, any unused tokens 201 from the previous cycle are forfeited.) Note that the value to use for n is once again a field configurable design parameter, and can be set to, e.g., 2, 4, 6, etc.

As noted above, in different embodiments, microburst pacing and token slicing can be run together or separately. In one embodiment, both are enabled by default.

Figure 3:
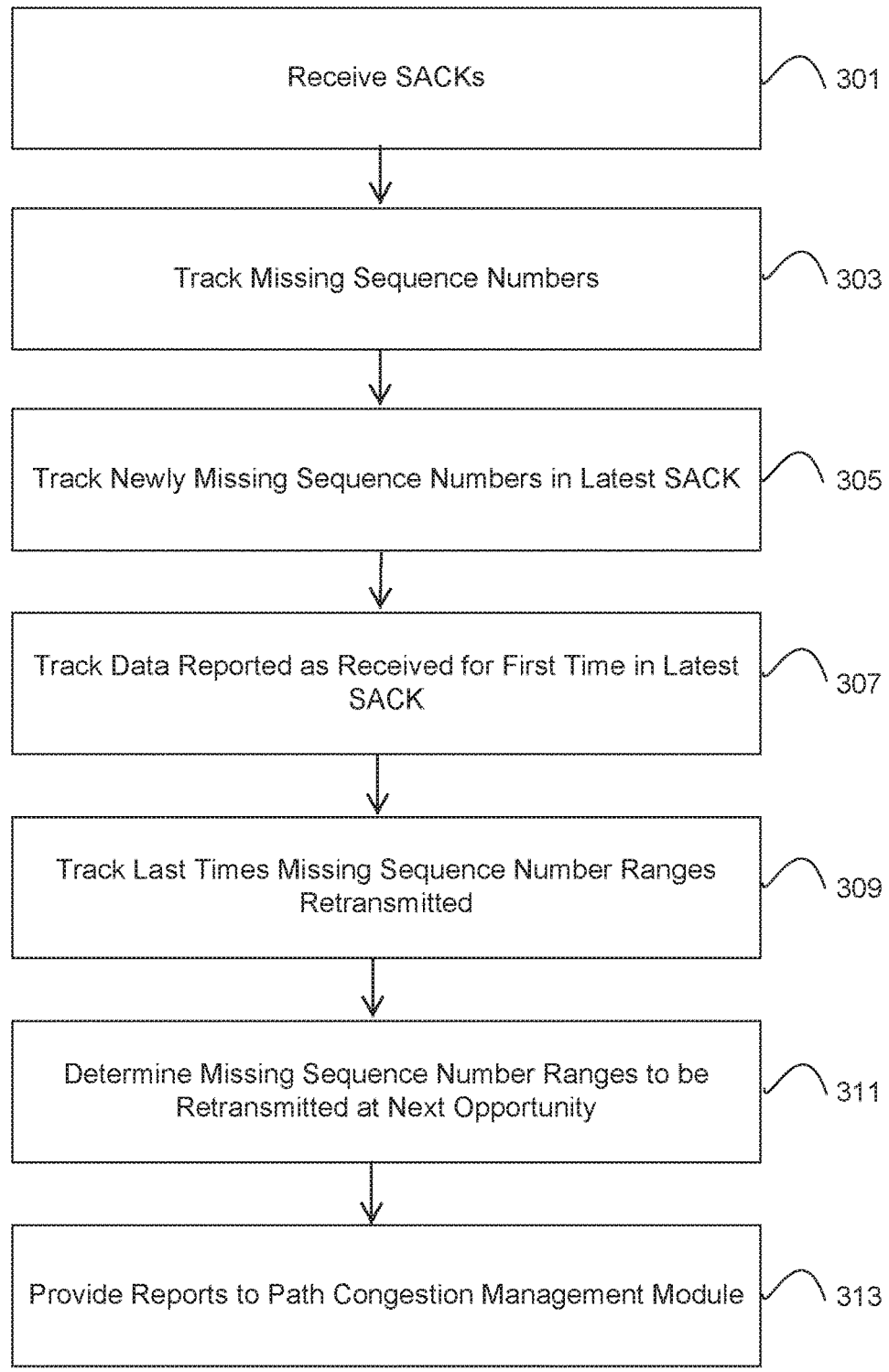
FIG. 3 is a flowchart illustrating steps performed by a loss management module of the loss tolerant TCP component, according to some embodiments.

FIG. 3 illustrates loss management steps according to some embodiments. The loss management module 203 receives 301 SACKs from the receiving endpoint, tracks 303 all missing sequence numbers reported therein, tracks 305 newly missing sequence numbers, and tracks 307 data being reported as received for the first time in the latest SACK. The loss management module 203 also tracks 309 the last times at which particular missing sequence number ranges were retransmitted, and determines 311 which missing sequence number ranges are to be retransmitted at the next output opportunity. The loss management module 203 provides 313 reports of newly missing bytes to the path congestion management module 200, which uses this information to monitor the congestion state 215 of the path.

Figure 4:
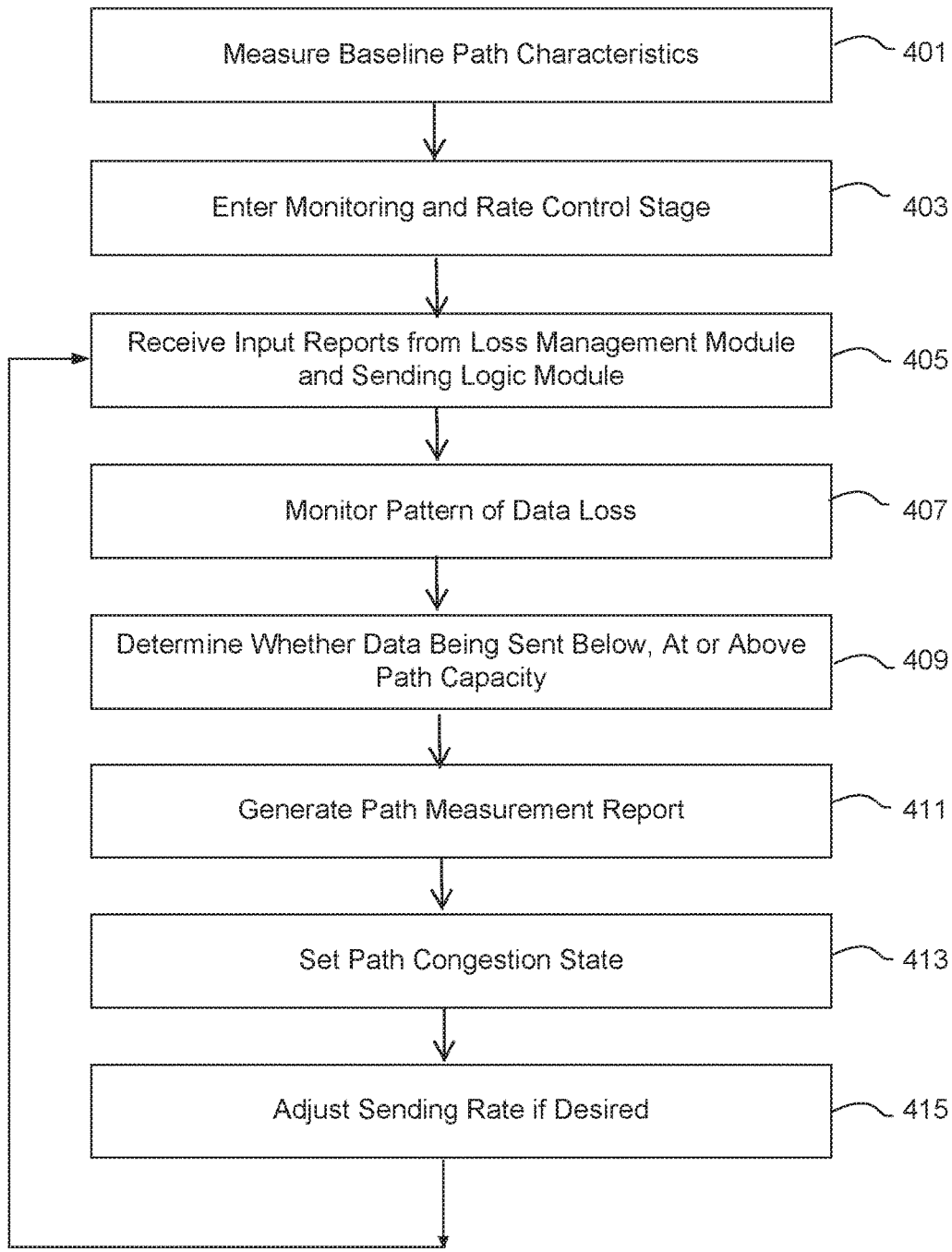
FIG. 4 is a flowchart illustrating steps performed by a path congestion management module of the loss tolerant TCP component, according to some embodiments.

FIG. 4 illustrates path congestion management steps according to some embodiments. The path congestion management module 200 measures 401 the baseline characteristics of the path at the beginning of a TCP session, until a given number of packets have been sent, or until a congestion event occurs. The path congestion management module 200 then enters 403 a monitoring and rate control stage. In this stage, once per management cycle (e.g., one SRTT) the path congestion management module 200 receives 405 as input reports of newly missing bytes from the loss management module 203, and reports of the amount of data recently sent from the sending logic module 205. Based on this information, the path congestion management module 200 monitors 407 the pattern of data loss reported by the receiving endpoint, and determines 409 whether data is being transmitted below, at/close to, or above the underlying path capacity. A path measurement report is generated 411, the path's congestion state is set 413, and where appropriate, the sending rate is adjusted 415. The next management cycle then begins.

Figure 5:
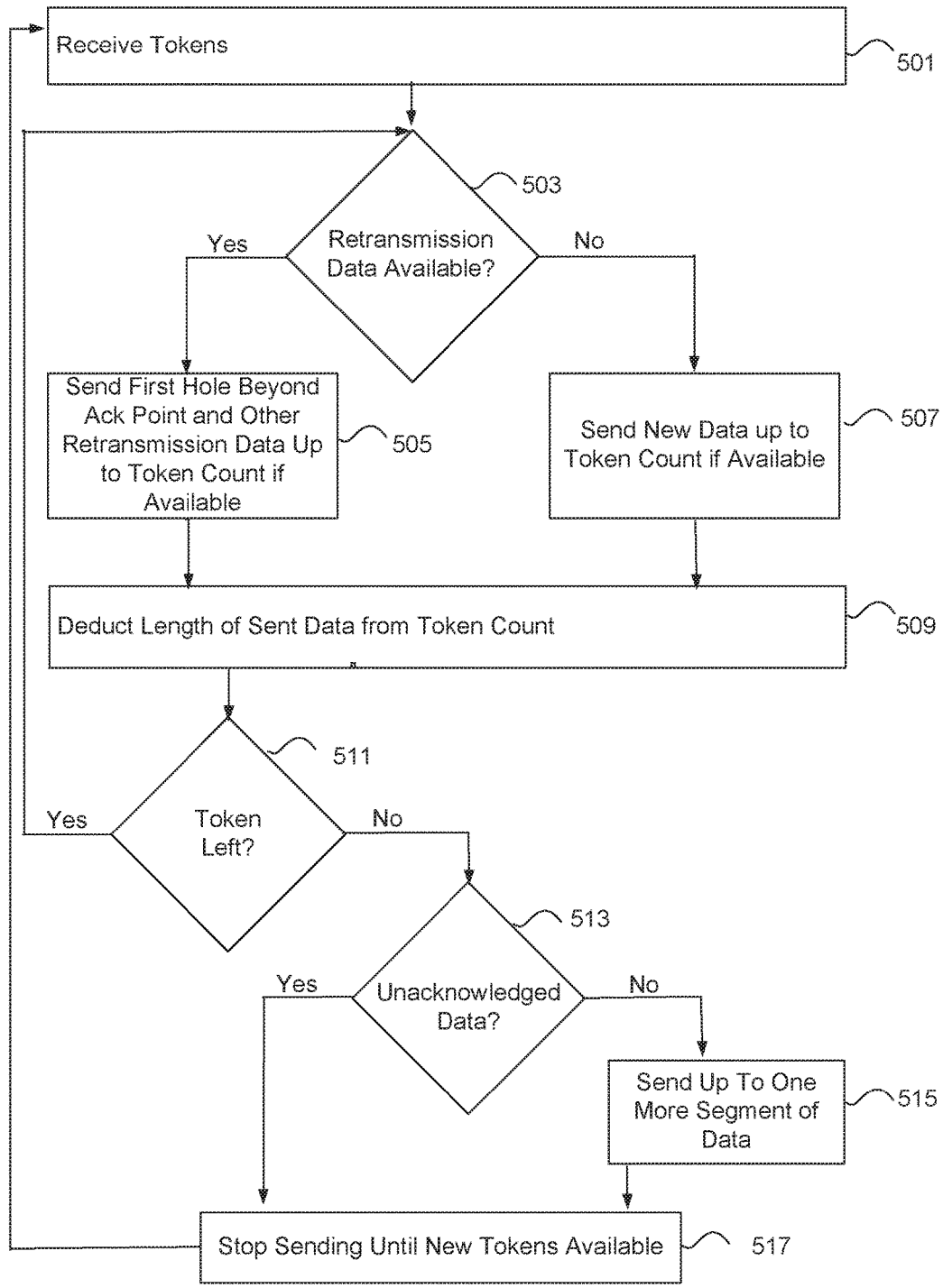
FIG. 5 is a flowchart illustrating steps performed by a sending logic module of the loss tolerant TCP component, according to some embodiments.

FIG. 5 illustrates sending logic steps according to some embodiments. The sending logic module 205 receives 501 tokens 201 granted by the path congestion management module 200, indicating how much data can be transmitted. The sending logic module 205 determines 503 whether there is retransmission data available. In response to determining that retransmission data is available, the sending logic module 205 sends 505 the first hole beyond the current ACK point and then any other retransmission data that is ready to be retransmitted up to the token count. In response to determining that there is no retransmission data available, the sending logic module 205 sends 507 new data up to the token count. After each successful transmission, the sending logic module 205 deducts 509 the length of the data sent from the token count. The sending logic module 205 then determines 511 whether there is more token 201 left. If so, retransmitted and/or new data is sent as described above. If no more token is available, the sending logic module 205 next determines 513 whether there is currently any unacknowledged data outstanding. If so, the sending logic module 205 sends 515 up to one segment of extra data. (Note also that if there is no more token 201 available but the sending logic module 205 is attempting to send a retransmission of the first hole beyond current ACK point, that hole is sent regardless.) Otherwise, if there is no more token 201 available, the sending logic module 205 stops 517 sending data until new tokens 201 are granted from the path congestion management module 200.

Figure 6:
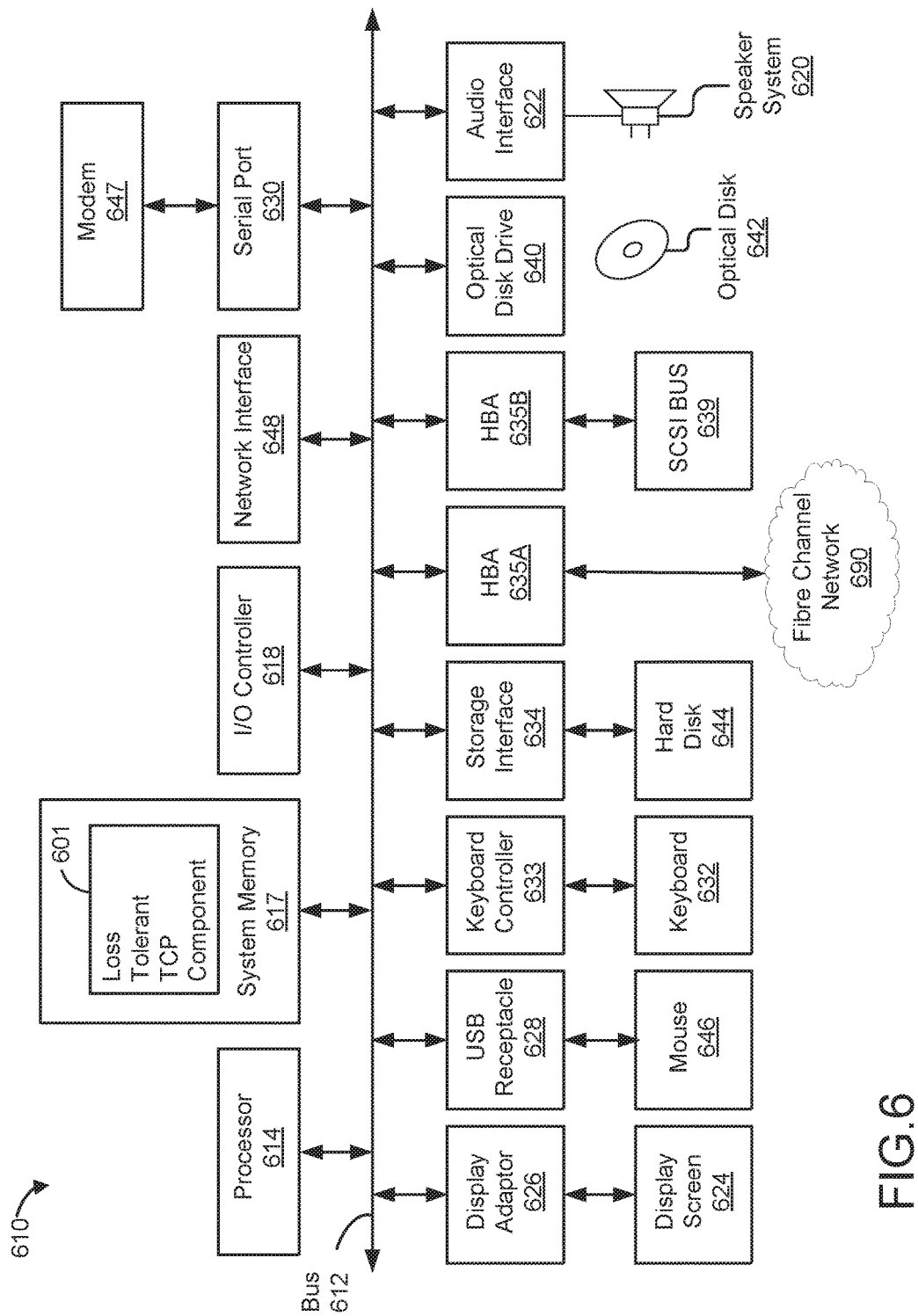
FIG. 6 is a block diagram of a computer system suitable for implementing a loss tolerant TCP component, according to some embodiments.

FIG. 6 is a block diagram of a computer system 610 suitable for implementing a loss tolerant TCP component 101. Both clients 103 and servers 105 can be implemented in the form of such computer systems 610. As illustrated, one component of the computer system 610 is a bus 612. The bus 612 communicatively couples other components of the computer system 610, such as at least one processor 614, system memory 617 (e.g., random access memory (RAM), read-only memory (ROM), flash memory), an input/output (I/O) controller 618, an audio output interface 622 communicatively coupled to an audio output device such as a speaker 620, a display adapter 626 communicatively coupled to a video output device such as a display screen 64624, one or more interfaces such as Universal Serial Bus (USB) receptacles 628, serial ports 63630, parallel ports (not illustrated), etc., a keyboard controller 633 communicatively coupled to a keyboard 632, a storage interface 634 communicatively coupled to one or more hard disk(s) 644 (or other form(s) of storage media), a host bus adapter (HBA) interface card 635A configured to connect with a Fibre Channel (FC) network 690, an HBA interface card 635B configured to connect to a SCSI bus 639, an optical disk drive 640 configured to receive an optical disk 642, a mouse 646 (or other pointing device) coupled to the bus 612, e.g., via a USB receptacle 628, a modem 647 coupled to bus 612, e.g., via a serial port 63630, and one or more wired and/or wireless network interface(s) 648 coupled, e.g., directly to bus 612.

Other components (not illustrated) may be connected in a similar manner (e.g., document scanners, digital cameras, printers, etc.). Conversely, all of the components illustrated in FIG. 6 need not be present (e.g., smartphones and tablets typically do not have optical disk drives 640, external keyboards 632 or external pointing devices 646, although various external components can be coupled to mobile computing devices via, e.g., USB receptacles 628). The various components can be interconnected in different ways from that shown in FIG. 6.

The bus 612 allows data communication between the processor 614 and system memory 617, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 644, optical disk 642) and loaded into system memory 617 and executed by the processor 614. Application programs can also be loaded into system memory 617 from a remote location (i.e., a remotely located computer system 610), for example via the network interface 648 or modem 647. In FIG. 6, the loss tolerant TCP component 101 is illustrated as residing in system memory 617.

The storage interface 634 is coupled to one or more hard disks 644 (and/or other standard storage media). The hard disk(s) 644 may be a part of computer system 610, or may be physically separate and accessed through other interface systems.

The network interface 648 and/or modem 647 can be directly or indirectly communicatively coupled to a network 107 such as the internet. Such coupling can be wired or wireless.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

Aspects of the subject matter described herein are set out in the following numbered clauses:

1. A computer implemented method comprising: during a Transmission Control Protocol ("TCP") session between a sending endpoint computer and a receiving endpoint computer, monitoring, by the sending endpoint computer, amounts of data sent and patterns of data loss as data is sent to the receiving endpoint computer, periodically determining, by the sending endpoint computer, whether data is being sent below, at or above path capacity, based on the monitored amounts of data sent and patterns of data loss, and periodically dynamically adjusting, by the sending endpoint computer, a rate at which data is sent to the receiving endpoint computer, in response to determining whether data is being sent below, at or above path capacity.

2. The method of clause 1 further comprising: during the TCP session, first executing a path characteristics measurement phase during which the rate at which data is sent to the receiving endpoint computer is regulated according to a TCP slow-start process, and subsequently, after a specific amount of data has been sent or a path congestion event has been detected, executing a path congestion monitoring and rate control phase, during which the rate at which data is sent to the receiving endpoint computer is periodically dynamically adjusted in response to determining whether data is being sent below, at or above path capacity, by the sending endpoint computer.

3. The method of clause 2 further comprising: during the path characteristics measurement phase, tracking a Congestion Window ("cwnd") which is grown out of the TCP slow-start process, data sent, data lost, and a maximum selective acknowledgement ("SACK") hole size observed, by the sending endpoint computer, and during the path congestion monitoring and rate control phase, utilizing information tracked during the path characteristics measurement phase to begin an initial dynamic adjustment of the rate at which data is sent to the receiving endpoint computer, by the sending endpoint computer.

4. The method of clause 2 further comprising: during the path congestion monitoring and rate control phase, dynamically adjusting, by the sending endpoint computer, the rate at which data is sent to the receiving endpoint computer, once per management cycle of the TCP session.

5. The method of clause 4 wherein: each management cycle of the TCP session is equal to one Smoothed Round-trip Time ("SRTT").

6. The method of clause 2 further comprising: during the path congestion monitoring and rate control phase, tracking bytes sent, bytes lost, and SACK hole patterns observed during each management cycle, by the sending endpoint computer, and utilizing tracked bytes sent, bytes lost, and SACK hole patterns observed during previous management cycles to dynamically adjust the rate at which data is sent to the receiving endpoint computer in subsequent management cycles, by the sending endpoint computer.

7. The method of clause 2 further comprising: during the path congestion monitoring and rate control phase, during each specific management cycle, determining how much data to send to the receiving endpoint computer in a next management cycle, based on an amount of data sent during the specific management cycle, an amount of data newly lost during the specific management cycle, and information concerning SACK holes and attempts to retransmit them during the specific management cycle, by the sending endpoint computer.

8. The method of clause 1 further comprising: tracking, by the sending endpoint computer, newly reported missing bytes identified by SACKs from the receiving endpoint computer, tracking, by the sending endpoint computer, times at which identified SACK holes were last sent to the receiving endpoint computer, periodically determining a current path congestion state based on the tracked newly reported missing bytes, the tracked times at which identified SACK holes were last retransmitted to the receiving endpoint computer, amounts of data sent to the receiving endpoint computer and a previous path congestion state, and periodically adjusting, by the sending endpoint computer, the rate at which data is sent to the receiving endpoint computer, based on periodically determined current path contestation states.

9. The method of clause 1 further comprising: tracking, by the sending endpoint computer, information concerning incoming SACKs from the receiving endpoint computer, the information concerning incoming SACKs further comprising SACK holes, newly reported missing bytes identified by SACKs and times at which identified SACK holes were last retransmitted to the receiving endpoint computer, and when retransmitting SACK holes to the receiving endpoint computer by the sending endpoint computer, giving priority as follows: first SACK hole beyond a current acknowledgement ("ACK") point, SACK holes that have never previously been fully retransmitted from oldest to newest, and SACK holes that have been fully retransmitted but have not been retransmitted within a specific amount of time from oldest to newest.

10. The method of clause 1 further comprising: tracking times at which identified SACK holes were last retransmitted to the receiving endpoint computer as timestamps of recorded kernel ticks, by the sending endpoint computer.

11. The method of clause 1 further comprising: during sending of data to the receiving endpoint computer, enforcing the periodically dynamically adjusted rate, by the sending endpoint computer.

12. The method of clause 1 further comprising: during sending of data to the receiving endpoint computer, enforcing the periodically dynamically adjusted rate, while observing the TCP receiver window, by the sending endpoint computer.

13. The method of clause 1 further comprising: during sending of data to the receiving endpoint computer, enforcing the periodically dynamically adjusted rate using a token bucket, by the sending endpoint computer.

14. The method of clause 13 further comprising: during each specific one of a plurality of management cycles, dividing tokens granted for the specific management cycle into a plurality of slices, by the sending endpoint computer, and pacing release of the slices and corresponding sending of data to the receiving endpoint computer across the specific management cycle, by the sending endpoint computer.

15. The method of clause 1 further comprising: during sending of data to the receiving endpoint computer at the periodically dynamically adjusted rate, giving priority as follows: retransmission of a first SACK hole beyond the current ACK point, other retransmission data, and new data.

16. The method of clause 1 further comprising: during sending of new data to the receiving endpoint computer at the periodically dynamically adjusted rate, dividing the new data into microbursts, each microburst comprising a specific number of segments, and sending one microburst of data at a time, with a specific amount of time between microbursts, thereby spreading the sending of microbursts across a SRTT.

17. At least one non-transitory computer readable-storage medium storing computer executable instructions that, when loaded into computer memory and executed by at least one processor of a computing device, cause the computing device to perform the following steps: during a Transmission Control Protocol ("TCP") session between a sending endpoint computer and a receiving endpoint computer, monitoring, by the sending endpoint computer, amounts of data sent and patterns of data loss as data is sent to the receiving endpoint computer, periodically determining, by the sending endpoint computer, whether data is being sent below, at or above path capacity, based on the monitored amounts of data sent and patterns of data loss, and periodically dynamically adjusting, by the sending endpoint computer, a rate at which data is sent to the receiving endpoint computer, in response to determining whether data is being sent below, at or above path capacity.

18. The at least one non-transitory computer readable-storage medium of clause 17 further comprising computer executable instructions that, when loaded into computer memory and executed by at least one processor of the computing device, cause the computing device to perform the following additional steps: tracking, by the sending endpoint computer, newly reported missing bytes identified by SACKs from the receiving endpoint computer, tracking, by the sending endpoint computer, times at which identified SACK holes were last sent to the receiving endpoint computer, periodically determining a current path congestion state based on the tracked newly reported missing bytes, the tracked times at which identified SACK holes were last retransmitted to the receiving endpoint computer, amounts of data sent to the receiving endpoint computer and a previous path congestion state, and periodically adjusting, by the sending endpoint computer, the rate at which data is sent to the receiving endpoint computer, based on periodically determined current path contestation states.

The at least one non-transitory computer readable-storage medium of clause 17 further comprising computer executable instructions that, when loaded into computer memory and executed by at least one processor of the computing device, cause the computing device to perform the following additional steps: tracking, by the sending endpoint computer, information concerning incoming SACKs from the receiving endpoint computer, the information concerning incoming SACKs further comprising SACK holes, newly reported missing bytes identified by SACKs and times at which identified SACK holes were last retransmitted to the receiving endpoint computer, and when retransmitting SACK holes to the receiving endpoint computer by the sending endpoint computer, giving priority as follows: first SACK hole beyond a current acknowledgement ("ACK") point, SACK holes that have never previously been fully retransmitted from oldest to newest, and SACK holes that have been fully retransmitted but have not been retransmitted within a specific amount of time from oldest to newest.

20. The at least one non-transitory computer readable-storage medium of clause 17 further comprising computer executable instructions that, when loaded into computer memory and executed by at least one processor of the computing device, cause the computing device to perform the following additional step: during sending of data to the receiving endpoint computer, enforcing the periodically dynamically adjusted rate, by the sending endpoint computer.

What is claimed is:

1. A computer-implemented method comprising:
analyzing one or more data transmission characteristics during a Transmission Control Protocol ("TCP") session between a sending endpoint computer and a receiving endpoint computer;
determining whether data is being sent below, at, or above path capacity, based on the analyzed data transmission characteristics;
determining that one or more tokens were assigned to a specified management cycle of the TCP session, each token indicating an amount of data that is transmittable to the receiving endpoint computer during the management cycle;

dividing the one or more tokens into a plurality of token slices; and pacing release of the plurality of token slices across the management cycle.

2. The method of claim 1, further comprising:

regulating, during the TCP session, the pace at which token slices are released to the receiving endpoint computer according to a TCP slow-start process, and subsequently, after a specific amount of token slices have been released, dynamically adjusting the pace at which token slices are released to the receiving endpoint computer in response to determining whether data is being sent below, at, or above path capacity.

3. The method of claim 2, further comprising:

tracking at least one of the following relative to the sending endpoint computer: an amount of token slices released, an amount of token slices lost, a maximum selective acknowledgement (SACK) hole size observed, or a congestion window; and utilizing the tracked information to dynamically adjust the pace at which token slices are released to the receiving endpoint computer.

4. The method of claim 2, wherein pacing release of the plurality of token slices across the management cycle comprises dynamically adjusting the pace at which token slices are released to the receiving endpoint computer at least once per management cycle of the TCP session.

5. The method of claim 4, wherein each management cycle of the TCP session is equal to one Smoothed Round-trip Time ("SRTT").

6. The method of claim 2, further comprising:

tracking bytes sent, bytes lost, and SACK hole patterns observed during each management cycle; and dynamically adjusting the pace at which token slices are released to the receiving endpoint computer in subsequent management cycles based on the tracked bytes sent, bytes lost, and SACK hole patterns observed during previous management cycles.

7. The method of claim 2, further comprising:

determining, during each management cycle, how many token slices to release to the receiving endpoint computer in a next management cycle, based on one or more of the following: an amount of token slices released during each management cycle, an amount token slices newly lost during each management cycle, or information indicating a number of attempts to retransmit SACK holes during each management cycle.

8. The method of claim 1, further comprising:

tracking one or more newly reported missing bytes identified by SACKs from the receiving endpoint computer;

tracking times at which identified SACK holes were last sent to the receiving endpoint computer;

periodically determining a current path congestion state based on at least one of the following: the tracked newly reported missing bytes, the tracked times at which identified SACK holes were last retransmitted to the receiving endpoint computer, amounts of token slices released to the receiving endpoint computer, or a previous path congestion state; and periodically adjusting the pace at which token slices are released to the receiving endpoint computer, based on the periodically determined current path congestion states.

9. The method of claim 1, further comprising:

tracking SACK information regarding incoming SACKs from the receiving endpoint computer, the SACK information further comprising at least one of SACK holes, newly reported missing bytes identified by SACKs, or times at which identified SACK holes were last retransmitted to the receiving endpoint computer; and when retransmitting SACK holes to the receiving endpoint computer, prioritizing retransmission as follows: firstly, SACK holes beyond a current acknowledgement point, secondly, SACK holes that have never previously been fully retransmitted, from oldest to newest, and thirdly, SACK holes that have been fully retransmitted but have not been retransmitted within a specific amount of time, from oldest to newest.

10. A system comprising:

at least one physical processor;

physical memory comprising computer-executable instructions that, when executed by the physical processor, cause the physical processor to:

analyze one or more data transmission characteristics during a Transmission Control Protocol ("TCP") session between a sending endpoint computer and a receiving endpoint computer;

determine whether data is being sent below, at, or above path capacity, based on the analyzed data transmission characteristics;

determine that one or more tokens were assigned to a specified management cycle of the TCP session, each token indicating an amount of data that is transmittable to the receiving endpoint computer during the management cycle;

divide the one or more tokens into a plurality of token slices; and pace release of the plurality of token slices across the management cycle.

11. The system of claim 10, wherein the physical processor is further configured to track times at which identified SACK holes were last retransmitted to the receiving endpoint computer as timestamps of recorded kernel ticks.

12. The system of claim 10, wherein the physical processor is further configured to periodically dynamically adjust the pace at which the token slices are released to the receiving endpoint computer.

13. The system of claim 12, wherein the physical processor is further configured to enforce the periodically dynamically determined adjusted pace at which token slices are released, while observing a TCP receiver window indicating an amount of data the receiving endpoint computer can accept without acknowledging the sending endpoint computer.

14. The system of claim 10, wherein during release of the token slices to the receiving endpoint computer, the physical processor is further configured to enforce the periodically dynamically adjusted pace using a token bucket.

15. The system of claim 14, wherein the physical processor is further configured to deduct the number of token slices successfully sent to the receiving endpoint computer from a token count of the token bucket.

16. The system of claim 14, wherein the physical processor is further configured to prioritize token slices, while pacing release of the token slices to the receiving endpoint computer at the periodically dynamically adjusted pace, as follows: firstly, retransmission of a first SACK hole beyond the current acknowledgement point, secondly, other retransmission token slices, and thirdly, new token slices.

17. The system of claim 16, wherein the physical processor is further configured to divide, during sending of new token slices to the receiving endpoint computer at the periodically dynamically adjusted pace, the new token slices into microbursts, each microburst comprising a specific number of segments; and send one microburst of data at a time, with a specific amount of time between microbursts, thereby spreading the sending of microbursts across an SRTT.

18. A non-transitory computer-readable medium comprising one or more computer-executable instructions that, when executed by at least one processor of a computing device, cause the computing device to:

analyze one or more data transmission characteristics during a Transmission Control Protocol ("TCP") session between a sending endpoint computer and a receiving endpoint computer;

determine whether data is being sent below, at, or above path capacity, based on the analyzed data transmission characteristics;

determine that one or more tokens were assigned to a specified management cycle of the TCP session, each token indicating an amount of data that is transmittable to the receiving endpoint computer during the management cycle;

divide the one or more tokens into a plurality of token slices; and pace release of the plurality of token slices across the management cycle.

19. The non-transitory computer readable-storage medium of claim 18, wherein the computing device is further configured to:

track information concerning incoming SACKs from the receiving endpoint computer, the information concerning incoming SACKs further comprising at least one of: SACK holes, newly reported missing bytes identified by SACKs, or times at which identified SACK holes were last retransmitted to the receiving endpoint computer; and when retransmitting SACK holes to the receiving endpoint computer, prioritizing the retransmission as follows: firstly, SACK holes beyond a current acknowledgement point, secondly, SACK holes that have never previously been fully retransmitted, from oldest to newest, and thirdly, SACK holes that have been fully retransmitted but have not been retransmitted within a specific amount of time, from oldest to newest.

20. The non-transitory computer readable-storage medium of claim 19, wherein the computing device is further configured to: determine and enforce a dynamically adjusted pace while pacing release of the token slices across the management cycle.

* * * * *